United States Patent
Grinshpun et al.

(10) Patent No.: US 9,130,965 B2
(45) Date of Patent: Sep. 8, 2015

(54) METHOD OF CALL CONFERENCING TO SUPPORT SESSION CONTINUITY FOR MULTI-MODE CLIENTS

(75) Inventors: Edward Grinshpun, Freehold, NJ (US); Chung-Zin Liu, Naperville, IL (US); Simon S. Ou, Naperville, IL (US); Lily H. Zhu, Parsippany, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2088 days.

(21) Appl. No.: 11/943,085

(22) Filed: Nov. 20, 2007

(65) Prior Publication Data
US 2009/0129296 A1 May 21, 2009

(51) Int. Cl.
*H04L 12/66* (2006.01)
*H04L 29/06* (2006.01)
*H04W 36/02* (2009.01)
*H04W 4/00* (2009.01)
*H04L 12/28* (2006.01)
*H04L 12/56* (2006.01)
*H04W 36/00* (2009.01)
*H04W 36/14* (2009.01)
*H04W 36/28* (2009.01)

(52) U.S. Cl.
CPC ........ *H04L 65/1083* (2013.01); *H04L 65/4015* (2013.01); *H04W 36/026* (2013.01); *H04W 36/0016* (2013.01); *H04W 36/14* (2013.01); *H04W 36/28* (2013.01)

(58) Field of Classification Search
USPC .......................................... 370/352, 331, 401
See application file for complete search history.

(56) References Cited

U.S. PATENT DOCUMENTS

2004/0235509 A1* 11/2004 Burritt et al. .................. 455/519
2005/0083907 A1* 4/2005 Fishler .......................... 370/352
2006/0153247 A1* 7/2006 Stumer ......................... 370/517
2006/0258358 A1* 11/2006 Kallio .......................... 455/437
2006/0286984 A1* 12/2006 Bonner ......................... 455/445
2007/0070948 A1 3/2007 Kezys et al.

FOREIGN PATENT DOCUMENTS

EP          1 696 685 A    8/2006
WO       WO02/062083      8/2002
WO       WO2005/051025    6/2005

OTHER PUBLICATIONS

Communication relating to the results of the International Search Report from counterpart International Application No. PCT/US2008/012799 dated Mar. 31, 2009.
Written Opinion dated Mar. 31, 2009.

* cited by examiner

*Primary Examiner* — Asad Nawaz
*Assistant Examiner* — Stephanie Chang
(74) *Attorney, Agent, or Firm* — Davidson Sheehan LLP (57) ABSTRACT

The present invention provides methods of inter-technology handoff of a multi-mode mobile unit in a packet-switched communication system. One embodiment of the method includes establishing a call from a first application layer client in the first mobile unit using a first wireless communication link that operates according to a first wireless access technology. The method also includes sending, in response to detecting changing conditions of the first wireless communication link, a request to form a conference call including the first application layer client and inviting a second application layer client in the first mobile unit to join the conference call. The second application layer client uses a second wireless communication link that operates according to a second wireless access technology. The method further includes handing off the call from the first application layer client to the second application layer client.

20 Claims, 5 Drawing Sheets

METHOD OF CALL CONFERENCING TO SUPPORT SESSION CONTINUITY FOR MULTI-MODE CLIENTS

CROSS REFERENCE TO RELATED APPLICATIONS

There are no related applications.

BACKGROUND OF THE INVENTION

1. Field of the Invention

This invention relates generally to communication systems, and, more particularly, to wireless communication systems.

2. Description of the Related Art

Conventional wireless communication systems provide wireless connectivity using base stations or other wireless entities such as access points, base station routers, and the like. For example, a mobile unit may establish a wireless communication link over an air interface with a base station that is a communicatively coupled to a network. The mobile unit may use the wireless communication link to access services provided by the network such as establishing a communication session with another mobile unit. The information transmitted using the communication session between the two mobile units may be analog or digital information and the communication path between the mobile units may be formed using a circuit-switched architecture or a packet-switched architecture. In a circuit-switched architecture, a dedicated communication path is formed between the two mobile units and may only be used by the two mobile units. In contrast, packet-switched architectures divide the information up into packets that can be transmitted along numerous paths between the two mobile units using a common packet network infrastructure for forwarding the packets between the mobile units and their network peers. Thus, some or all of the paths through a packet-switched network infrastructure may be shared by other mobile units or other entities coupled to the packet-switched network such as a network server or a fixed subscriber.

Voice over Internet Protocol (VoIP) is a technique for encoding audio signals (such as voice signals) into a digital format that can be used to form packets for transmission over a packet-switched network. The VoIP packets are typically referred to as delay-intolerant information because large delays between successive packets at the destination VoIP session peer (e.g., a mobile unit) may degrade the quality of the audio signal produced by the source peer. Consequently, VoIP applications are typically constrained to provide VoIP packets at a selected quality-of-service (QoS) level. For example, a VoIP application implemented in a mobile unit may be required to maintain minimum levels of delay, latency, and the like for packets transmitted over the network. In some cases, customers may pay larger fees to obtain overall higher QoS levels of higher QoS levels for certain applications.

Numerous wireless access technologies may be used to support packet data applications. Some exemplary wireless access technologies include second generation (2G), third generation (3G), and fourth generation (4G) technologies such as IX-EVDO, UMTS and WIMAX. These wireless access technologies operate according to standards and/or protocols such as the standards and/or protocols established by the Third Generation Partnership Project (3GPP, 3GPP2) and WiMAX Forum Network Working Group (NWG). Equipment vendors are developing and deploying dual mode (or multi-mode) mobile units that are capable of communicating using multiple wireless access technologies. For example, a dual-mode mobile unit may implement two independent means of IP connectivity that operate according to two different wireless access technologies. At the same time, service providers are increasingly using more than one wireless access technology to provide wireless connectivity. For example, some service providers have deployed heterogeneous networks that include overlaid meshes that operate according to different access technologies. The overlaid meshes may be used as part of an evolution from a legacy technology to a newer technology or for other reasons, such as reducing deployment and/or operating costs, improving the overall communication spectrum characteristics, and the like.

Individual mobile units may frequently handoff between base stations that operate according to different wireless access technologies as the mobile unit moves through a heterogeneous network. For example, a mobile unit may initially be using a wireless communication link formed according to the EV-DO standards and/or protocols for a VoIP call. The mobile unit may then determine that the signal quality of the EV-DO wireless communication link has degraded and may elect to handoff to a base station that operates according to the WIMAX communication standards and/or protocols. Conventional handoff protocols attempt to maintain seamless connectivity of the VoIP session as it is handed off from the fading EV-DO wireless communication link to the stronger WIMAX link. However, conventional handoff protocols do not maintain the QoS level of the call during the handoff.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In embodiments of the present invention, methods of inter-technology handoff of a multi-mode mobile unit in a packet-switched communication system are provided. One embodiment of the method includes establishing a call from a first application layer client in the first mobile unit using a first wireless communication link that operates according to a first wireless access technology. The method also includes sending, in response to detecting changing conditions of the first wireless communication link, a request to form a conference call including the first application layer client and inviting a second application layer client in the first mobile unit to join the conference call. The second application layer client uses a second wireless communication link that operates according to a second wireless access technology. The method further includes handing off the call from the first application layer client to the second application layer client.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
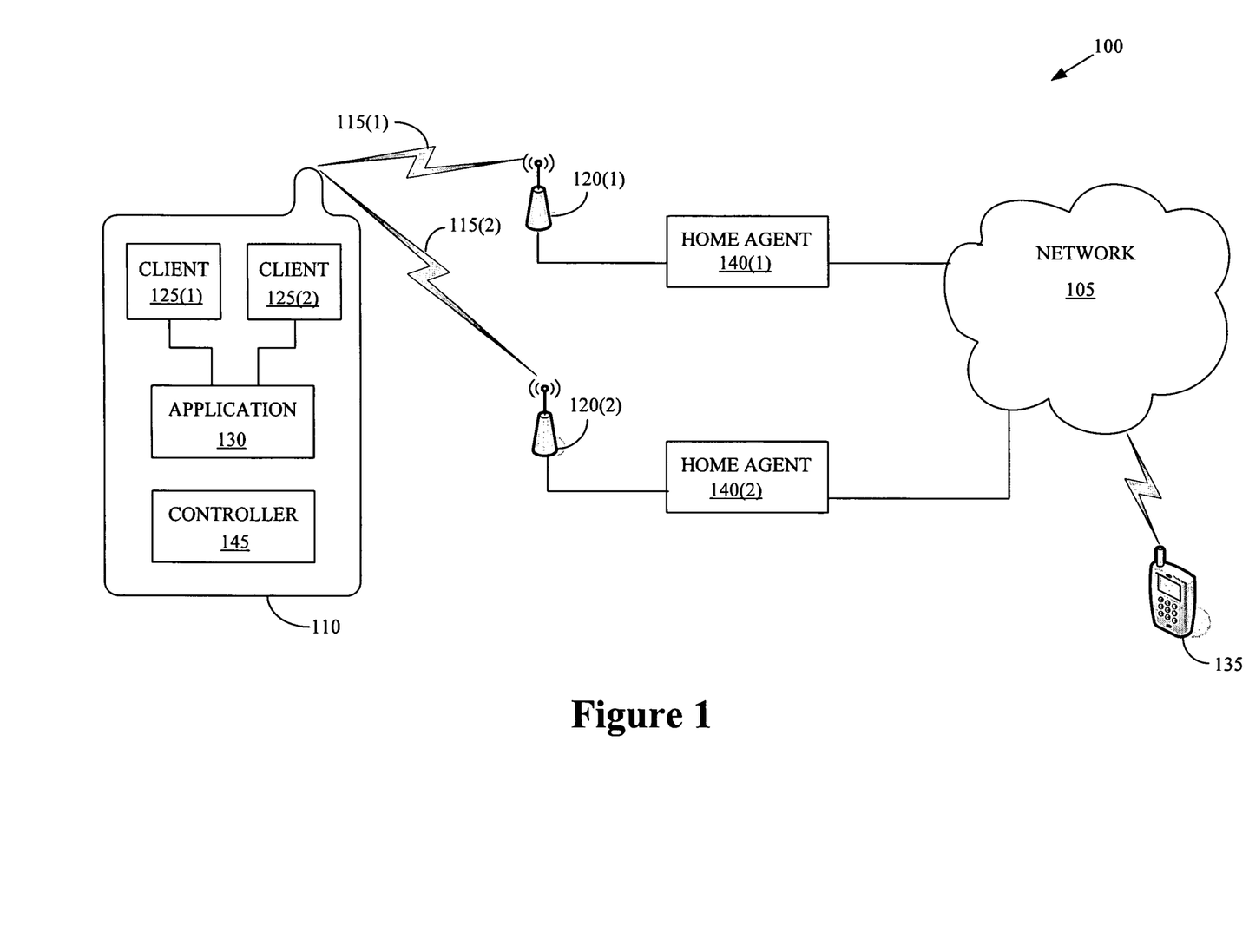
FIG. 1 conceptually illustrates a first exemplary embodiment of a wireless communication system, in accordance with the present invention.

FIG. 1 conceptually illustrates a first exemplary embodiment of a wireless communication system 100. In the illustrated embodiment, the wireless communication system 100 includes a network 105 that may be used to support packet-switched communication. Portions of the network 105 may operate according to various standards and/or protocols including the Internet Protocol (IP), the Mobile Internet Protocol (MIP), standards and/or protocols defined by the Third Generation Partnership Project (3GPP, 3GPP2) such as Universal Mobile Telecommunication Services (UMTS), Evolved Data-Optimized (EV-DO), WIMAX, and the like. However, persons of ordinary skill in the art having benefit of the present disclosure should appreciate that the present invention is not limited to these exemplary standards and/or protocols. In alternative embodiments, portions of the wireless communication system 100 and/or the network 105 may operate according to any standards and/or protocols.

One or more mobile units 110 may establish wireless communication with the network 105. In the illustrated embodiment, the mobile unit 110 is a dual-mode device that may form wireless communication links according to two different wireless access technologies. For example, the mobile unit 110 may be able to operate using either the EV-DO wireless access technology or the WIMAX wireless access technology. However, persons of ordinary skill in the art having benefit of the present disclosure should appreciate that the present invention is not limited to mobile units 110 that operate according to these to wireless access technologies. In alternative embodiments, the mobile units 110 may be dual-mode devices that can operate according to other combinations of wireless access technologies. Furthermore, in some embodiments, the mobile units 110 may be multi-mode devices that can operate according to more than two different wireless access technologies. In these embodiments, the handovers described herein may be performed between any selected combinations of supported wireless access technologies.

In operation, the mobile unit 110 may form a wireless communication link 115(1) with a radio access network 120(1) that operate according to a first wireless access technologies, such as EV-DO. In the illustrated embodiment, the mobile unit 110 may instantiate a client 125(1) at the application layer according to the first wireless access technology. As used herein, the term "layer" refers to different levels of a hierarchical architecture that is defined for wireless communication. A layer is a collection of related functions that provides services to the layer above it and receives service from the layer below it. One exemplary layer definition is the Open Systems Interconnection (OSI) Basic Reference Model that defines (from top to bottom) the Application, Presentation, Session, Transport, Network, Data Link, and Physical layers. An application 130 in the mobile unit 110, such as a VoIP application, may use the client 125(1) for communication over the wireless communication link 115(1). For example, the mobile unit 110 may establish an IP session over the wireless communication link 115(1) and use this IP session to establish a call with a mobile unit 135 via the radio access network 120(1), an associated home agent 140(1), and the network 105. However, persons of ordinary skill in the art having benefit of the present disclosure should appreciate that the call may not be terminated at mobile unit 135 and alternatively may be terminated by any type of communication device.

A controller 145 in the mobile unit 110 may monitor channel conditions associated with the wireless communication link 115(1). If the controller 145 determines that the channel conditions of the wireless communication link 115(1) have degraded, the controller 145 may initiate a handover to a different wireless access technology. For example, the controller 145 may compare a parameter such as a pilot signal strength, a signal-to-noise ratio, a signal-to-noise-plus-interference ratio, a bit error rate, and the like to an appropriate threshold to determine when the channel conditions have degraded to the point that a handover to a different wireless access technology is desirable and/or necessary. The handoff may also be triggered based on preconfigured application-based policy preferences. For example, a handover from VoIP to EVDO may be triggered as soon as the target technology signal strength is greater than certain threshold, irrespective of the source technology signal strength. Furthermore, the handoff may be triggered based on preconfigured user preferences. For example, if WiMAX access is cheaper the controller 145 may elect to switch to WiMAX as soon as it's signal strength is adequate. In some cases, the service provider network policy may override the user policy.

When the controller 145 decides to initiate a handover, the controller 145 may cause the mobile unit 110 to instantiate a second client 125(2) according to the second wireless access technology. The second client 125(2) may then establish an IP session over a wireless communication link 115(2) to a radio access network 120(2) and a corresponding home agent 140(2). For example, to provide seamless mobility and maintain QoS when mobile unit 110 switches IP sessions, separate IP/MIP sessions may be independently established over each wireless communication link 115. The proposed mechanism may be particularly useful in cases when mobile unit vendors implement MIP clients that are tightly coupled with on-chip device drivers, as well as in cases when different technology standards choose not to use MIP Client (e.g., using PMIP client in the radio access network).

Once the second IP session has been established, the client 125(1) may send a request to form a conference call to the network 105. The requested conference call may include the client 125(1) and the mobile unit 135. The client 125(1) may also send an invitation that invites the second client 125(2) to join the conference call. If the client 125(2) accepts the invitation and joins the conference call using the second IP session, then the mobile unit 110 may receive packets via the client 125(2). To avoid duplicating the information received at the application 130, the controller 145 may instruct the application 130 to ignore or drop any packets received via the client 125(2) while both of the clients 125 are active. The controller 145 may hand off the call from the first client 125(1) to the second client 125(2). Once the call has been handed off to the second client 125(2), the controller 145 may instruct the application 130 to ignore or drop any packets received via the client 125(1). In one embodiment, the client 125(1) may tear down the wireless communication link 115(1) and release all the associated resources. The call may then continue as a peer-to-peer call between the client 125(2) and the mobile unit 135.

Figure 2:
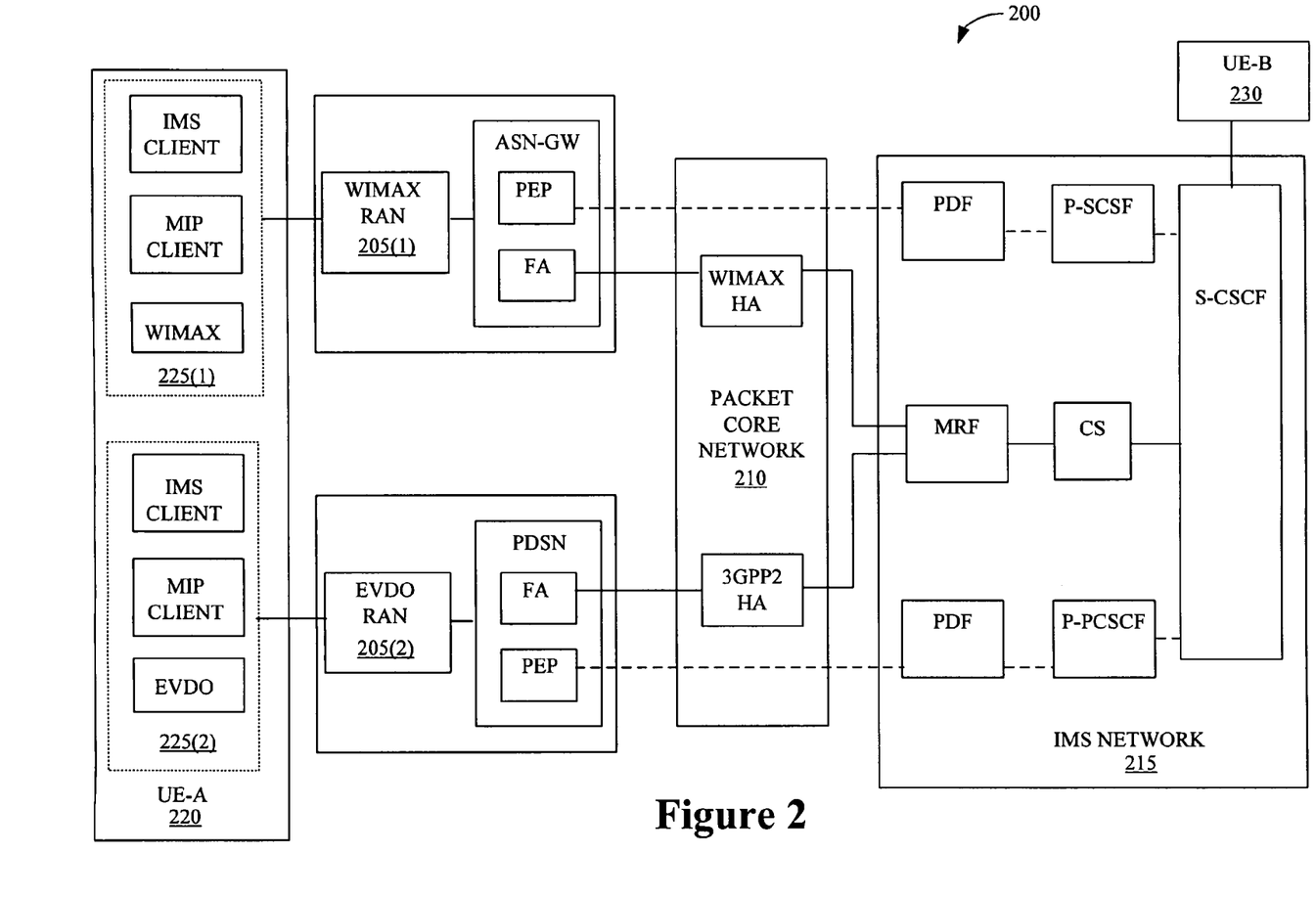
FIG. 2 conceptually illustrates a second exemplary embodiment of a wireless communication system, in accordance with the present invention.

FIG. 2 conceptually illustrates a second exemplary embodiment of a wireless communication system 200. In the illustrated embodiment, the wireless communication system 200 is implemented according to the reference architecture of the Client MIPv4-based model. Exemplary portions of the reference architecture are described in the 3GPP2 CDMA Packet Core Technical Specification (TIA-835), the WiMAX Forum, and the 3GPP IMS Technical Specification. The wireless communication system 200 therefore includes at least two separate access technology dependent radio access networks (RANs) 205. Operation of the wireless communication system 200 will be described herein in the context of the reference architecture of the Client MIPv4-based model. However, persons of ordinary skill in the art having benefit of the present disclosure should appreciate that the second exemplary embodiment is intended to be illustrative and not to limit the present invention to this particular reference architecture. In alternative embodiments, other reference architectures including other functional entities may also be used to describe and/or implement the wireless communication system 200.

A wireless communication system 200 may implement common (or separate) MIP home agents (HAs), separate access technology dependent proxy call session control functions (P-CSCFs) and a common serving CSCF (S-CSCF) with a common media resource function MRF. In the illustrated embodiment, the radio access networks 205 include a WIMAX RAN 205(1) that is coupled to an access serving network-gateway (ASN-GW) that includes a policy enforcement point (PEP) and a foreign agent (FA). The radio access networks 205 also include an EVDO RAN 205(1) that is coupled to a packet data serving node (PDSN) that includes a PEP and a foreign agent (FA). The foreign agents in the ASN-GW and PDSN can communicate with a WIMAX home agent (HA) and a 3GPP2 home agent, respectively, which are located in a packet core network 210. The home agents can communicate with a media resource function (MRF) located in an IP multimedia subsystem (IMS) network 215. The MRF can communicate with a serving call session control function (S-CSCF). The PEP entities can communicate with PDF entities, which are coupled to proxy CSCF (P-CSCF) entities in the IMS network 215. The P-CSCF entities are communicatively coupled to the S-CSCF.

A first mobile unit (or user equipment, UE-A) 220 is a dual transceiver mobile unit that can support multiple clients that operate according to different wireless access technologies.

In the illustrated embodiment, the mobile unit 220 can implement two application layer clients 225 that may be used to establish IP connectivity with the corresponding RAN 205. The first client 225(1) operates according to the WIMAX wireless access technology and the second client 225(2) operates according to the EVDO wireless access technology. The clients 225 both support an MIP client and an IMS client. Persons of ordinary skill in the art should appreciate that the WIMAX and EVDO access technologies are used as examples and are not intended to limit the present invention. In alternative embodiments, the techniques described herein could also be used to support interworking of packet data (BE or QoS) from other wireless access technologies.

The two independent instances of the IMS clients 225 on the mobile unit 220 can interwork with the independent IMS P-CSCFs, respectively. For example, a VoIP call may be established between the IMS client 225(1) and another client at another mobile unit (UE-B) 230 over an IP session established by the MIP client 225(1) over a WiMAX connection. Connection management in the mobile unit 220 is triggered by detecting changes in the radio conditions over the WIMAX connection. The connection management function in the mobile unit 220 may initiate establishment of an IP session using MIP client 225(2) over an EVDO link. The IMS client 225(2) may perform SIP registration with the EVDO RAN 205(2). IMS Client 225(1) then triggers conferencing of the existing call between the client 225(1) and the other mobile unit 230 by sending a command to a conference server (CS) to allocate a conference instance. Upon receipt of the command, the conference server may trigger creation of a conference focus at the MRF. The client 225(1) joins the conference and then refers the appropriate client at the mobile unit 230 to the newly created conference uniform resource identifier (URI). The IMS Client 225(1) also refers the IMS Client 225(2) at the mobile unit 220 to the same conference call URI. Client 225(2) is then connected to MRF and the connection manager in the mobile unit 220 can hand off the call from the client 225(1) to the client 225(2). The IMS Client 225(1) can then release the corresponding IMS session and connection to the conference circuit. In one embodiment, the conference circuit can be released and a two way call can be established between the client 225(2) and the mobile unit 230. The MIP Client 225(1) can optionally release the corresponding MIP session over the WiMAX link, which can be optionally terminated. The VoIP session then continues over EVDO link.

Figure 3:
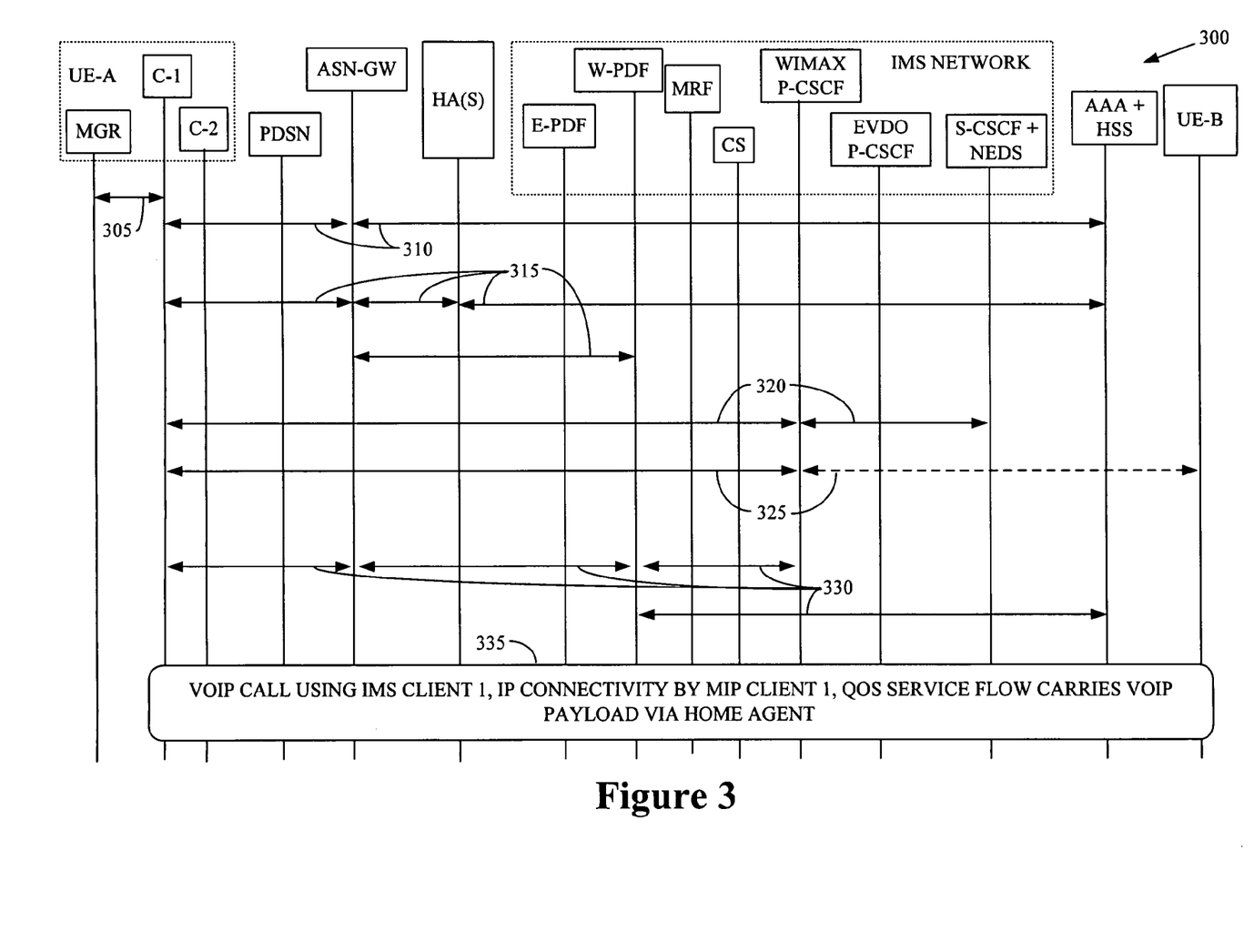
FIGS. 3, 4, and 5 illustrate portions of one exemplary embodiment of a method of call conferencing that supports session continuity for multi-mode user equipment in a packet-based wireless communication system, in accordance with the present invention.
Figure 4:
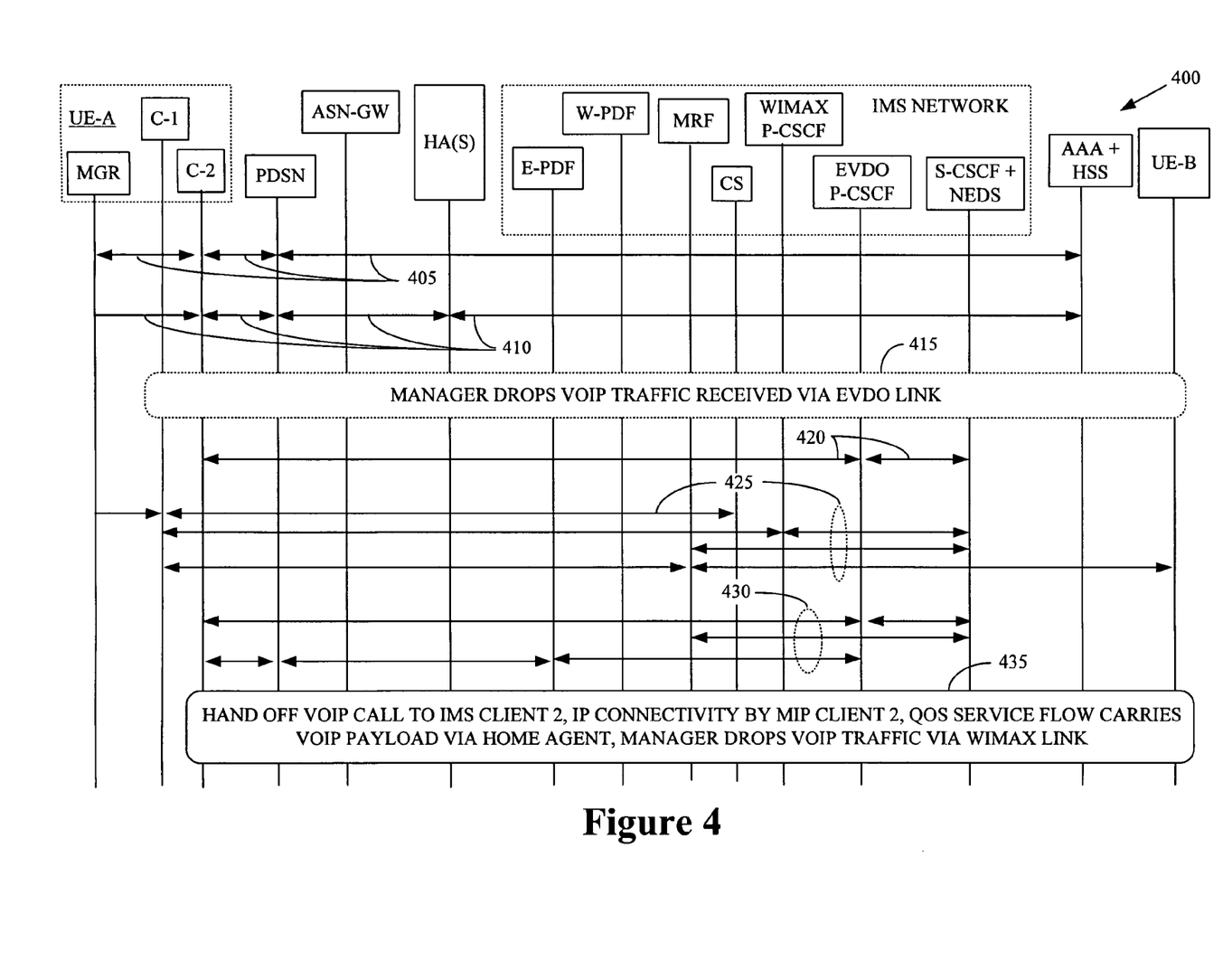
Figure 5:
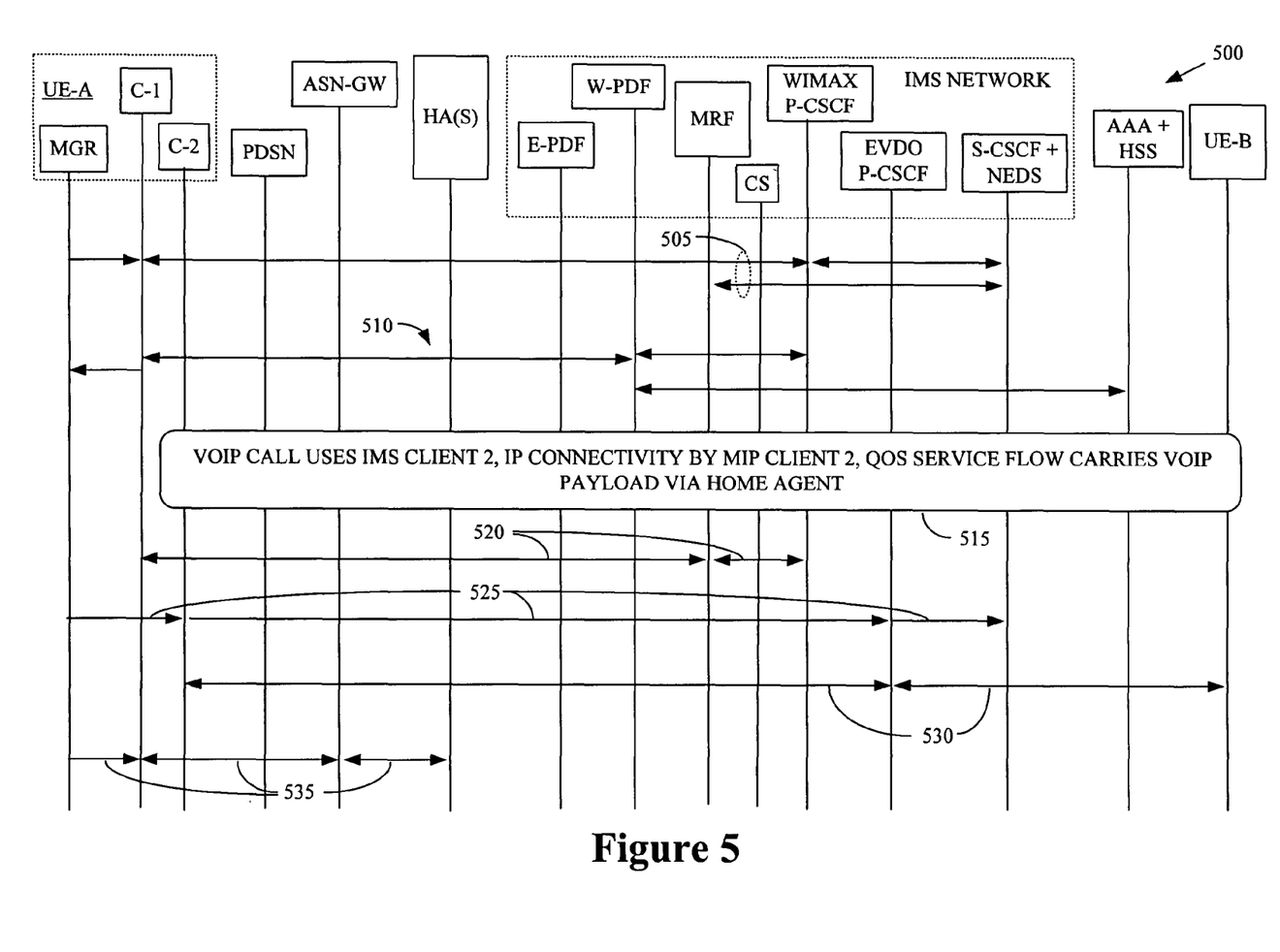

FIGS. 3, 4, and 5 illustrate portions 300, 400, 500 of one exemplary embodiment of a method of call conferencing that supports session continuity for multi-mode user equipment in a packet-based wireless communication system. In the illustrated embodiment, the packet-based wireless communication system provides wireless connectivity to at least one mobile unit or user equipment (UE). The user equipment includes a manager entity, sometimes referred to as an intelligent connection manager, that is configured to monitor channel conditions and manage hand offs between multiple clients that operate according to different wireless access technologies. In the illustrated embodiment, the user equipment supports two wireless access technologies (WIMAX and EVDO) and so the user equipment can support two clients (C-1 and C-2) that communicate over the air interface using dual access technology radios associated with independent means of IP connectivity establishment for each wireless access technology. For example, the radios may be MIP client-based, DHCP client-based when the corresponding RAN supports Proxy MIP Client functionality, or a combination of these and/or other radio implementations. In embodiments that use a network access identifier (NAI) for access authentication, different NAIs may be used for each wireless access technology. The user equipment also supports separate instance of the IMS clients with different uniform resource identifiers (URI) for each wireless access technology.

The wireless communication system also includes access technology specific RANs that conform to the corresponding standards. In the example below the wireless access technologies are EVDO and WiMAX and so the RANs include access serving network gateways (ASN-GW) and packet data serving nodes (PDSNs), respectively. In one embodiment, the RANs support MTPv4 client-based user equipment. However, persons of ordinary skill in the art should appreciate that the present invention is not limited to these particular wireless access technologies. When MIP is used for IP connectivity establishment, then one or more mobility Home Agent(s) are implemented in the wireless communication system. In alternative embodiments, a single home agent may be used for both clients (C-1 and C-2) or separate home agents may be used for the two clients (C-1 and C-2). Furthermore, in multi-mode user equipment that support more than two wireless access technologies, additional home agents may be used to provide IP connectivity to the different clients in the user equipment.

In the illustrated embodiment, the wireless communication system includes an authentication, authorization, and accounting (AAA) server and an IMS network that includes various access technology specific functional entities. For example, the IMS network includes access technology specific P-CSCF and PDF functional elements, as well as a common S-CSCF and a common MRF. The IMS network also supports a conference server (CS) that can receive and act upon various conference call creation, management, and termination commands. Persons of ordinary skill in the art having benefit of the present disclosure should appreciate that the particular functional entities shown in FIGS. 3, 4, and 5 are intended to be illustrative and not to limit the present invention. In alternative embodiments, the wireless communication system may include more or fewer functional entities that perform the same functions as described herein or which perform other functions.

FIG. 3 conceptually illustrates one exemplary method 300 for initiating a quality-of-service flow for an application implemented in user equipment (UE). In the illustrated embodiment, the application is a VoIP application for supporting calls according to an Internet protocol. The application initially establishes the quality-of-service flow using a first client (C-1) that operates according to the WIMAX standards and/or protocols. The user equipment powers up and the connection manager (MGR) decides to establish a WiMAX connection, e.g. based upon link conditions and/or policies. The connection manager transmits (at 305) a signal or message requesting that the client (C-1) establish the WIMAX connection. The WiMAX connection is established via WiMAX RAN using NWG-defined procedures, as indicated by the arrows 310. In one embodiment, establishing (at 310) the WiMAX connection includes performing user EAP authentication based upon the NAI assigned to the WiMAX wireless communication link. Although the arrows 310 (and other events shown in FIG. 3) are depicted as indicating that the connection and authentication steps occur at the same time, persons of ordinary skill in the art having benefit of the present disclosure should appreciate that the precise sequence of events may be different than indicated in FIG. 3. For example, events that appear simultaneous in FIG. 3 may occur in a staggered fashion or concurrently.

Mobile IP connectivity is established over WiMAX connection and the corresponding call session is set up, as indicated by arrows 315. The first client (C-1) obtains an IP address over the WiMAX link. In this example, IP connectivity is established using MIPv4 procedures (specified by NWG) with the WiMAX-coupled MTPv4 client (C-1). Best effort default data flow is set up (at 315). To support network-initiated QoS flow setup, the WiMAX ASN gateway may register with the WiMAX PDF function in the IMS infrastructure (at 315). The IMS Client 1 (which is instantiated for WiMAX access technology) performs SIP registration with the WiMAX-associated P-CSCF and the common S-CSCF according to procedures defined by 3GPP and IETF, as indicated by arrows 320. A VoIP call is set up between the user equipment (UE-A and UE-B) over the IP session established via WiMAX link using standard SIP signaling procedure, via WiMAX associated P-CSCF, common S-CSCF, as indicated by the arrows 325. In case of network-initiated flow setup, WiMAX PDF function can be used to set up the WiMAX QoS service flow (SF) for this VoIP call, as indicated by arrows 330. Following this set up procedure, the VoIP session is ongoing (at 335) over WiMAX link.

FIG. 4 conceptually illustrates one exemplary method 400 for handing off a quality-of-service flow between clients implemented in user equipment (UE). In the illustrated embodiment, the connection manager detects a change in the radio link conditions of the WiMAX wireless communication link and decides to move the VoIP session from the WiMAX link over to EVDO link. The EVDO client (C-2) may be created and the connection manager transmits (at 405) a signal or message to the EVDO client (C-2) to trigger the hand off. An EVDO UATI session is established over EVDO link and, in some embodiments, the client (C-2) is authenticated by performing user EAP authentication based upon the NAI assigned to the EVDO wireless communication link. A point-to-point protocol (PPP) session is set up (at 410) between C-2 and the home agent and, following PPP session setup, IP connectivity is established over EVDO connection (at 410). The client (C-2) obtains a second IP address (different that the IP address of C-1) over the EVDO link. In this example IP connectivity is established using MIPv4 procedures (specified by 3GPP2) with the EVDO link-coupled MIPv4 client (C-2). Best effort default data flow is setup. The 3GPP2 standards currently support UE-initiated flow setup and so EVDO PDSN registration with EVDO PDF function in the IMS infrastructure might be not needed in all embodiments. For the short duration of the handover, the VoIP call continues over WiMAX link and any VoIP traffic received via EVDO link is dropped (at 415).

The second IMS client (C-2) performs SIP registration with the EVDO P-CSCF using the EVDO-related URI and the EVDO interface IP address, as indicated by arrow 420. In various embodiments, the second IMS client (C-2) may perform (at 420) the SIP registration at any time after the hand off trigger is issued (at 410) to the client (C-2) and before the client (C-2) is invited to the conference call discussed below. In anticipation of the VoIP session handover and in response to a hand off trigger message or signal transmitted to the WiMAX client (C-1), the IMS client (C-1) conferences the ongoing call according to IETF, 3GPP, and/or TISPAN procedures, as indicated by the arrows 425. For example, the IMS Client (C-1) may send a command to the conference server (CS) to request allocation of a conference instance. The IMS Client (C-1) is then connected to the conference circuit (in the MRF) after the conference is successfully allocated. The IMS Client (C-1) may send an SIP INVITE via the WiMAX P-CSCF to the S-CSCF to trigger formation of a conference focus at the MRF using a conference call URI. The IMS Client (C-1) then sends an INVITE message using the conference URI to join the conference. The IMS Client (C-1) also sends a REFER message to the conference focus (via the conference server) to trigger transmission of P-CSCF INVITE messages to UE-B using the conference URI.

The EVDO client (C-2) may then be added to the conference, as indicated by the arrows 430. In the illustrated embodiment, the IMS Client (C-1) initiates inviting the IMS client (C-2) (over EVDO link) to the conference (according to 3GPP, IETF and TISPAN procedures). For example, the IMS client (C-1) may send a REFER message (via the conference server) that includes the IMS Client (C-2) URI to the conference focus. An INVITE message including the conference URI is also sent to IMS client (C-2). As part of a normal EVDO procedure to join the call, QoS data flow is setup between UE-A and EVDO RAN for the call. In the illustrated embodiment, the data path arbitration condition (at 415) still holds so that uplink VoIP packets are sent via WiMAX link and downlink VoIP packets that are received over the EVDO link are dropped. The connection manager then switches (at 435) the application VoIP path from the WiMAX link to the EVDO link. The VoIP uplink packets are now sent over EVDO link and all VoIP Downlink packets received over the WiMAX link may be dropped.

FIG. 5 conceptually illustrates one exemplary method 500 for establishing a peer-to-peer quality-of-service flow following hand off of a call session between clients implemented in user equipment (UE). In the illustrated embodiment, the connection manager instructs (at 505) the WiMAX client (IMS client C-1) to drop the conference call leg, e.g. by sending a SIP BYE message over the WiMAX interface. The quality of service flow associated with this leg of the conference call may then be dropped/deleted (at 510). The VoIP call leg of the conference call may then continue over the EVDO interface (at 515). In one embodiment, due to fading of the WiMAX link conditions, the IMS client (C-1) may perform SIP deregistration (at 520). The client (C-2) may also use standard SIP commands transmitted to the conference server (CS) to optionally release the conference circuit and allow the call to continue as a peer-to-peer call between IMS Client (C-2) and UE-B (at 525). In one embodiment, the IP session over WiMAX link and the WiMAX session may be torn down (at 530). Once the call is complete, the client (C-2) may end the call (at 535).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method implemented in a first mobile unit that supports multiple application layer clients that operate according to multiple wireless access technologies in a packet-switched communication system, comprising:

establishing a call from a first application layer client in the first mobile unit using a first wireless communication link that operates according to a first wireless access technology;

sending, in response to detecting changing conditions of the first wireless communication link, a request to form a conference call including the first application layer client;

joining a second application layer client in the first mobile unit to the conference call, the second application layer client using a second wireless communication link that operates according to a second wireless access technology different from the first wireless access technology, wherein packets received by the second application layer client are dropped or ignored prior to handing off the call from the first application layer client to the second application layer client; and handing off the call from the first application layer client to the second application layer client, wherein packets received by the first application layer client are dropped or ignored subsequent to handing off the call.

2. The method of claim 1, comprising establishing a first Internet Protocol session between the first application layer client and a home agent according to the first wireless access technology.

3. The method of claim 2, wherein establishing the call from the first application layer client comprises establishing the call over the first Internet Protocol session.

4. The method of claim 1, wherein establishing the call from the first application layer client comprises establishing the call between the first application layer client and a third application layer client in a second mobile unit.

5. The method of claim 1, comprising detecting changing conditions of the first wireless communication link.

6. The method of claim 5, wherein detecting changing conditions of the first wireless communication link comprises comparing at least one parameter indicative of at least one condition of the first wireless communication link to at least one threshold.

7. The method of claim 1, comprising establishing, in response to detecting changing conditions of the first wireless communication link, a second Internet Protocol session between the second application layer client and a home agent according to the second wireless access technology.

8. The method of claim 7, comprising joining the second application layer client to the conference call in response to the request sent by the first application layer client.

9. The method of claim 8, wherein joining the second application layer client to the conference call comprises establishing a quality-of-service data flow using the second Internet Protocol session.

10. The method of claim 1, wherein handing off the call from the first application layer client to the second application layer client comprises switching an application layer data path from the first application layer client to the second application layer client.

11. The method of claim 1, comprising dropping the first application layer client from the conference call in response to handing off the call from the first application layer client to the second application layer client.

12. A method implemented in a network that supports multiple wireless access technologies in a packet-switched communication system, comprising:
establishing a call with a first application layer client in a first mobile unit using a first wireless communication link that operates according to a first wireless access technology;
receiving, in response to the first mobile unit detecting changing conditions of the first wireless communication link, a request to form a conference call including the first application layer client;
joining a second application layer client in the first mobile unit to the conference call in response to receiving an invitation from the first application layer client, the second application layer client using a second wireless communication link that operates according to a second wireless access technology different from the first wireless access technology, wherein packets received by the second application layer client are dropped or ignored prior to handing off the call from the first application layer client to the second application layer client; and
handing off the call from the first application layer client to the second application layer client, wherein packets received by the first application layer client are dropped or ignored subsequent to handing off the call.

13. The method of claim 12, comprising establishing a first Internet Protocol session between the first application layer client and a home agent according to the first wireless access technology.

14. The method of claim 13, wherein establishing the call from the first application layer client comprises establishing the call over the first Internet Protocol session.

15. The method of claim 12, wherein establishing the call with the first application layer client comprises establishing a call between the first application layer client and a third application layer client in a second mobile unit.

16. The method of claim 12, comprising establishing, in response to the first mobile unit detecting changing conditions of the first wireless communication link, a second Internet Protocol session between the second application layer client and a home agent according to the second wireless access technology.

17. The method of claim 16, comprising joining the second application layer client to the conference call in response to the invitation sent by the first application layer client.

18. The method of claim 17, wherein joining the second application layer client to the conference call comprises establishing a quality-of-service data flow using the second Internet Protocol session.

19. The method of claim 12, comprising dropping the first application layer client from the conference call in response to handing off the call from the first application layer client to the second application layer client.

20. A method, comprising:
conferencing a second application layer client in a mobile unit into a call between a first application layer client in the mobile unit and a packet-switched communication system, wherein the first and second application layer clients receive packets associated with the call over first and second wireless communication links established according to first and second wireless access technologies, and wherein the second wireless communication link is established after the first wireless communication link in response to detecting changing conditions associated with the first wireless communication link, wherein packets received by the second application layer client are dropped or ignored prior to handing of the call from the first application layer client to the second application layer client;
handing off the call from the first application layer client to the second application layer client, wherein packets received by the first application layer client are dropped or ignored subsequent to handing off the call; and
dropping the first wireless communication link in response to handing off the call.

* * * * *